United States Patent
Braun et al.

(10) Patent No.: US 10,465,743 B2
(45) Date of Patent: Nov. 5, 2019

(54) FOIL BEARING

(71) Applicant: SCHAEFFLER TECHNOLOGIES AG & CO. KG, Herzogenaurach (DE)

(72) Inventors: Wolfgang Braun, Garstadt (DE); Simon Wehner, Herzogenaurach (DE); Philipp Wirth, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/060,207

(22) PCT Filed: Dec. 1, 2016

(86) PCT No.: PCT/DE2016/200568
§ 371 (c)(1),
(2) Date: Jun. 7, 2018

(87) PCT Pub. No.: WO2017/097298
PCT Pub. Date: Jun. 15, 2017

(65) Prior Publication Data
US 2018/0363696 A1 Dec. 20, 2018

(30) Foreign Application Priority Data
Dec. 10, 2015 (DE) .................. 10 2015 224 866

(51) Int. Cl.
*F16C 17/02* (2006.01)
*F16C 27/02* (2006.01)
*F16C 43/02* (2006.01)

(52) U.S. Cl.
CPC ............ *F16C 17/024* (2013.01); *F16C 27/02* (2013.01); *F16C 43/02* (2013.01)

(58) Field of Classification Search
CPC .......... F16C 17/04; F16C 25/04; F16C 27/02; F16C 43/02
USPC ........................................... 384/104
See application file for complete search history.

(56) References Cited

U.S. PATENT DOCUMENTS 4,295,689 A * 10/1981 Licht .................. F16O 17/024
384/103
5,902,049 A 5/1999 Heshmat
5,915,841 A * 6/1999 Weissert .............. F16O 17/024
384/104

(Continued)

FOREIGN PATENT DOCUMENTS

| CN | 104603480 A | 5/2015 |
|---|---|---|
| EP | 2937584 A1 | 10/2015 |
| WO | 2015125825 A1 | 8/2015 |

OTHER PUBLICATIONS

International Search Report for International Application No. PCT/DE2016/200568 dated Mar. 16, 2017.

*Primary Examiner* — James Pilkington
(74) *Attorney, Agent, or Firm* — Brooks Kushman P.C.

(57) ABSTRACT

A foil bearing for supporting a shaft includes a sleeve-type baring housing, at least one elastic corrugated foil arranged on the inner circumference of the bearing housing, and a respective top foil covering each corrugated foil and forming a bearing surface. The bearing housing includes insertion grooves defined therein that extend from the inner surface of the bearing housing and outwardly. The fop foil and the corrugated foil each have ends that are inserted into and received by the insertion grooves.

10 Claims, 3 Drawing Sheets

(56) References Cited

U.S. PATENT DOCUMENTS

| | | | | |
|---|---|---|---|---|
| 8,944,686 B2* | 2/2015 | Omori | ............... | F16O 17/024 |
| | | | | 384/103 |
| 9,376,959 B2* | 6/2016 | Yoshino | ............ | F16O 17/024 |
| 2014/0153850 A1 | 6/2014 | Omori | | |

* cited by examiner

FOIL BEARING

CROSS-REFERENCE TO RELATED APPLICATIONS

This application is the U.S. National Phase of PCT/DE2016/200568 filed Dec. 1, 2016, which claims priority to DE 102015224866.6 filed Dec. 10, 2015, the entire disclosures of which are incorporated by reference herein.

TECHNICAL FIELD

This disclosure relates to a foil bearing for supporting a shaft, including a sleeve-type bearing housing, at least one elastic corrugated foil arranged on the inner circumference of the bearing housing, and a respective top foil covering each corrugated foil and forming a bearing surface, with securement being provided on the inner face of the bearing housing.

BACKGROUND

Foil bearings are hydrodynamic or aerodynamic bearings in which in the case of an unloaded bearing a bearing surface supporting the shaft or supporting the pivoting rotor is formed by a thin and wear-resistant top foil which for its part is supported by an elastic corrugated foil arranged between the top foil and bearing housing wall. In operation a hydrodynamic or aerodynamic film bearing the shaft or the rotor is formed between the shaft and the top foil. Only during starting and stopping procedures is there direct moving contact between the shaft and the top foil. Foil bearings of the described type are preferably used for lightly loaded shafts running at high speed, for example compressors, gas turbines, turbo chargers and the like.

In the case of known foil bearings of the described type, the holder of the foil arrangement in the bearing housing, which on the one hand ensures a securing of the same in particular in rotational direction, but on the other hand is supposed to allow heat-induced compensatory movements of the foil arrangement, has proved to be very difficult from a design and production standpoint.

Foil bearings are known from U.S. Pat. No. 5,902,049, for example, in which case the foil arrangement consisting of outer foils, corrugated foils and top foils is supported in the circumferential direction on one side on a bolt fastened in suitable manner, for example by welding on the inside of the bearing housing. In the process, the end edge of the radially inner top foil is fastened on the bolt via tack or spot welding, while the associated end edges of the other foil layers are only supported on one side on the bolt. The end edges secured in this manner averted from the end edges of the corrugated and top foils run freely, so that the foil arrangement of this known bearing is essentially only sufficiently secured for one rotational direction. The described holder of the foil arrangement in the bearing housing is on the one hand extremely expensive from a design and production standpoint. On the other hand the bearing is limited in its use due to the on one side securing of the bearing arrangement.

Against this background, this disclosure addresses the problem of creating a foil bearing in which a securing of the foil arrangement is realized that is simple in design and production and suitable for both rotational directions.

SUMMARY

Various solutions to this problem are disclosed herein and are provided in the claims.

This disclosure accordingly proceeds from a foil bearing for supporting a shaft, comprising a sleeve-type bearing housing, at least one elastic corrugated foil arranged on the inner circumference of the bearing housing and a respective top foil covering each corrugated foil and forming a bearing surface, with an attachment being provided on the inner face of the bearing housing. To solve the problem, provision is made that insertion grooves are formed in the inner face of the bearing housing, the insertion grooves extending along surface lines, running obliquely from the inside to the outside and being used to hold at least the two end edges which delimit the top foil of each foil arrangement in the circumferential direction and which run substantially in the circumferential direction.

At least the two end edges of the top foil, which run substantially in the circumferential direction, engage in insertion grooves formed on the inner face of the bearing housing, correspondingly aligned which extend along the surface lines axially from one end of the bearing housing to the other end. The assembly of the foil arrangement occurs for example in such a way that initially the corrugated foil of a respective foil arrangement is inserted in the bearing housing, then the respective associated top foil is axially threaded into the insertion grooves and then completely pushed in. Along with the easy assembly of the foil arrangement, as a further advantage the foil bearing no longer has a preferred rotational direction, since the foil arrangements are arranged and secured in the same manner for both rotational directions. A disassembly and renewed assembly is moreover easily possible at any time.

So that the top foil can adapt to different mechanical or thermal loads, according to a further embodiment of this disclosure, provision is made that the depth of the insertion grooves is greater than the insertion depth of the associated end edges in the case of an unloaded top foil, and that the insertion grooves accommodate the end edges with a sliding fit. The insertion grooves are designed and dimensioned such that the end edges are held and guided in all operating conditions by the respective associated insertion groove.

In the previously described arrangement the corrugated foils are held by the respective associated top foil which cover said corrugated foils. According to another embodiment, provision is made that the corrugated foils themselves are also delimited in the circumferential direction by end edges which abut substantially parallel on the end edges of the associated top foils, and that the insertion grooves are designed such that they hold the parallel abutting end edges with sliding fit. In this way the corrugated foils are themselves secured in the same manner as the top foils, thus with the possibility of adapting to a mechanical or thermal load.

There is also the possibility of adapting to mechanical or thermal loads when, according to another embodiment, in the region in each case of one of the two insertion grooves assigned to a respective foil arrangement is provided with one or more thread holes penetrating the housing wall, said thread holes receiving the locking screws securing the mentioned end edges in the respective insertion groove.

An axial securing of the foil arrangement can in accordance with a further embodiment also be accomplished by the fact that a recess is formed at least in one end edge of a top foil or an end edge pair of a respective foil arrangement, in which a bolt or the like engages from the outside into the wall of the bearing housing to the recess in such a way that it secures the end edges in the axial direction but does not hinder their movement in the circumferential direction.

The foil bearing can be configured as a single surface bearing with a single foil arrangement covering the entire inner circumference of the bearing housing or also as a multiple surface bearing with several foil arrangements in each case covering circumferential sections of the bearing housing.

BRIEF DESCRIPTION OF THE DRAWINGS

Various embodiments will be explained in the following drawings. The figures show the following.

DETAILED DESCRIPTION OF THE DRAWINGS

Figure 1:
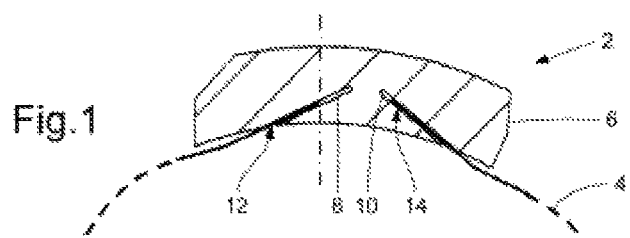
FIG. 1 shows a radial partial sectional view of a foil bearing in the region of a top foil securing in the circumferential direction.

FIG. 1 shows a partial sectional view of a foil bearing 2 in the region of a securing device for a top foil 4, for example of a single-surface bearing. On the inner face of a sleeve-type bearing housing 6 insertion grooves 8, 10 running obliquely from the inside to the outside are formed, in which end edges 12, 14 delimiting the top foil 4 in the circumferential direction and run substantially in the circumferential direction. The depth of the insertion grooves 8, 10 is in each case greater than the insertion depth of the associated end edges 12, 14 in the case of an unloaded top foil wherein the insertion grooves 8, 10 hold the associated end edges 12, 14 in each case with a sliding fit. In the case of a mechanical or thermal load of the top foil 4 the end edges 12, 14 can move into the associated insertion grooves 8, 10, so that the top foil 4 can adapt to the form changes of the foil arrangement caused by the loads.

Figure 3:
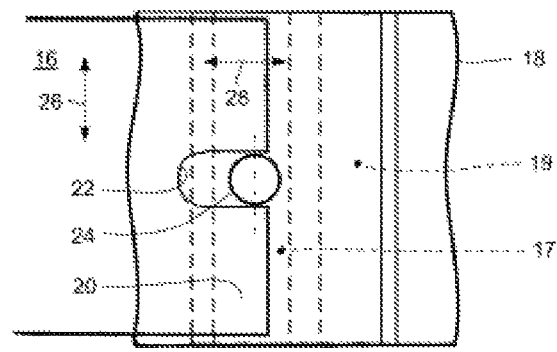
FIG. 3 shows a view of the arrangement according to FIG. 2 in the direction of arrow III.

The insertion grooves 8, 10; 17, 19 extend along the surface lines of the bearing housing 6, as can be recognized in particular on the basis of FIG. 3.

Figure 2:
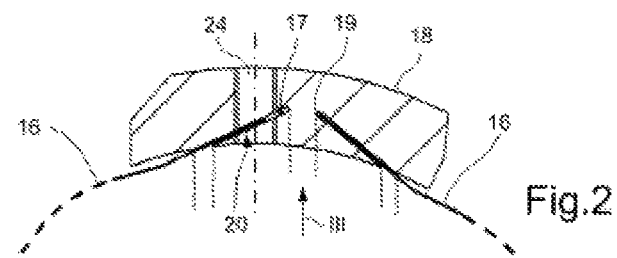
FIG. 2 shows a view similar to the one in FIG. 1 with an arrangement for an axial securing of the top foil.

FIGS. 2 and 3 show an arrangement for axial securing of a top foil 16 in a bearing housing 18. The two end edges 20 of the top foil 16 are held in two insertion grooves 17, 19. In at least one end edge 20 of the top foil 16 a recess is formed, in which a bolt 24 or pin 17 protruding from the outside into the wall of the bearing housing 18 through the insertion groove 17 to this recess engages such that it secures the top foil 16 in the axial direction marked by arrow 26, however whose movement does not hamper in the circumferential direction marked by arrow 28.

It should be noted here that in FIGS. 1 through 3 a corrugated foil arranged in each case between the top foils 4; 16 and the associated bearing houses 6; 18 is not shown for reasons of better clarity, however in each case said corrugated foil is provided.

Figure 4:
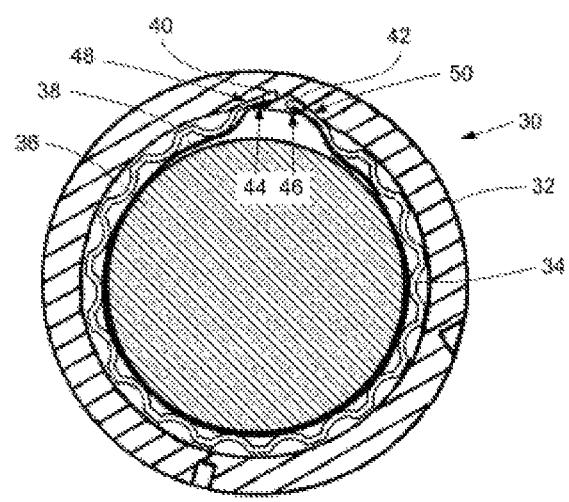
FIG. 4 shows a cross-section through a foil bearing in which the top foil and the corrugated foil are held in insertion grooves.

FIG. 4 shows a cross-section through a foil bearing 30 with a sleeve-type bearing housing 32, with an elastic corrugated foil 34 arranged on the inner circumference of the bearing housing 32 and with a top foil 38 covering said corrugated foil and forming a bearing surface for a shaft 36. On the inner face of the bearing housing 32, as in the preceding figures, two insertion grooves 40, 42 are formed. Both the two end edges 44, 46 of the top foil 38 and the two end edges 48, 50 of the corrugated foil 34 engage in these insertion grooves 40, 42. In the process, the end edges 44, 46 of the top foil 38 are in parallel contact on the end edges 48, 50 of the corrugated foil 34. The insertion grooves 40, 42 are likewise configures such, that their depth is greater than the insertion depth of the associated end edges in the case of unloaded foil arrangement, wherein the insertion grooves 40, 42 hold the mentioned end edges with a sliding fit.

It should be noted here that the arrangement for axial securing of the foil arrangement according to FIGS. 2 and 3 can also be provided for the exemplary embodiment mentioned previously.

The foil bearing 30 according to FIG. 4 is formed as a single-surface bearing. Accordingly, a foil arrangement formed from the corrugated foil 34 and the top foil 38 extends over the entire inner circumference of the bearing housing 32.

Figure 5:
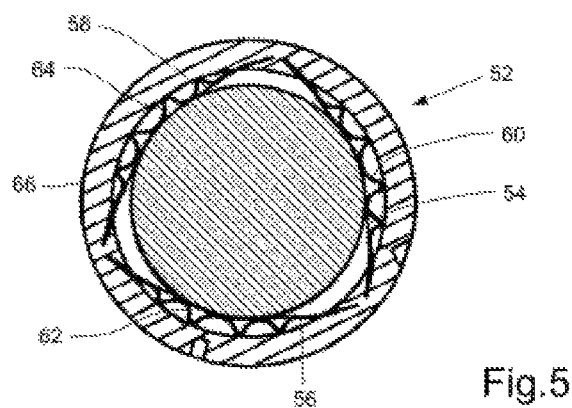
FIG. 5 shows a cross-section through a foil bearing configured as a three-surface bearing.

FIG. 5 shows a foil bearing 52, in the present case configured as a three-surface bearing, in which three foil arrangements consisting in each case of a top foil 54, 56, 58 and an associated corrugated foil 60, 62, 64, in each case covering a circumferential section of the bearing housing 66. Here again, either the end edges of the top foils 54, 56, 58 or the respective associated end edge pairs of the top foils 54, 56, 58 and the corrugated foils 60, 62, 64 are held in associated insertion grooves, which with respect to their design and dimensioning correspond to the insertion grooves described earlier.

Figure 6:
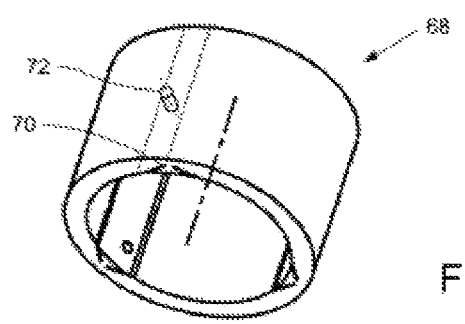
FIG. 6 shows a perspective view of a bearing housing with an arrangement for axial securing of a foil arrangement.

FIG. 6 shows a perspective view of a bearing housing 68, in whose housing wall in the region of an insertion groove 70 a radial borehole 72 is formed, in which a bolt corresponding to the bolt 24 according to FIG. 2 can be inserted for axial securing of a foil or foil arrangement.

Figure 7:
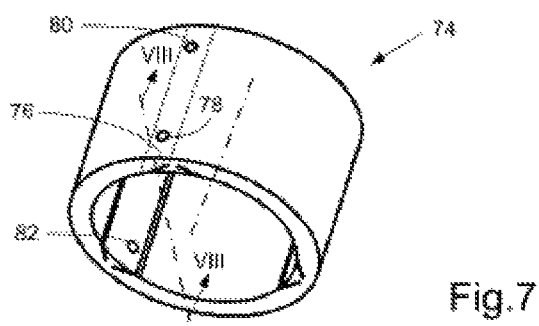
FIG. 7 shows a view similar to the one in FIG. 6, with an arrangement for securing of a foil arrangement in the circumferential direction.

FIG. 7 shows a perspective view of a bearing housing 74, wherein in the region of an insertion groove 76 by way of example two thread holes 78, 80 are formed, which the locking screws securing the end edges engaging in the insertion groove 76 can hold. Via such locking screws in each case an end edge or an end edge pair or also both end edges, or end edge pairs of a respective foil arrangement can be secured.

Figure 8:
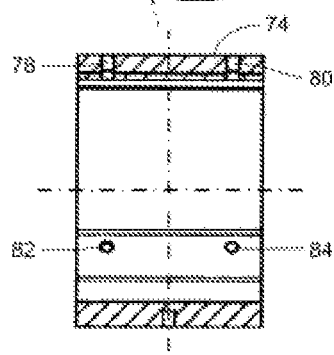
FIG. 8 shows an axial view through the bearing housing according to FIG. 7 along the line VIII-VIII.

FIG. 8 shows a longitudinal section through the bearing housing 74 according to FIG. 7 along the line of intersection VIII-VIII with the two thread holes 78, 80 as well as with two thread holes 82, 84 associated to a further insertion groove.

REFERENCE LIST

2 Foil bearing
4 Top foil
6 Bearing housing
8 Insertion groove
10 Insertion groove
12 End edge
14 End edge
16 Top foil
17 Insertion groove
18 Bearing housing
19 Insertion groove
20 End edge 22 Recess
24 Bolt
26 Arrow
28 Arrow
30 Foil bearing
32 Bearing housing
34 Corrugated foil
36 Shaft
38 Top foil
40 Insertion groove
42 Insertion groove
44 End edge
46 End edge
48 End edge
50 End edge
52 Foil bearing
54 Top foil
56 Top foil
58 Top foil
60 Corrugated foil
62 Corrugated foil
64 Corrugated foil
66 Bearing housing
68 Bearing housing
70 Insertion groove
72 Borehole
74 Bearing housing
76 Insertion groove
78 Thread hole
80 Thread hole
82 Thread hole
84 Thread hole

The invention claimed is:

1. A foil bearing for supporting a shaft, said bearing comprising:
    a sleeve-type bearing housing;
    at least one elastic corrugated foil arranged on an inner circumference of the bearing housing; and
    a respective top foil covering each of the at least one elastic corrugated foil, secured to the inner circumference of the bearing housing, and forming a bearing surface;
    wherein insertion grooves are formed in the inner circumference of the bearing housing, the insertion grooves extending along surface lines, running obliquely outwardly from the inner circumference of the bearing housing and each holding an end edge of the top foil which delimit the top foil in a circumferential direction and which run substantially in the circumferential direction; and
    wherein a recess is provided at least in one end edge of the top foil or an end edge pair of a respective foil arrangement, in which a bolt engages from an outside into a wall of the bearing housing to the recess in such a way that it secures the at least one end edge of the top foil or the end edge pair in an axial direction but does not hinder their movement in the circumferential direction.

2. The foil bearing according to claim 1, wherein a depth of the insertion grooves is greater than an insertion depth of the end edges, and the insertion grooves hold the end edges with a sliding fit.

3. The foil bearing according to claim 1, wherein the at least one corrugated foil is delimited in the circumferential direction by end edges which are substantially in parallel contact with the associated top foil, and the insertion grooves are configured such that they hold the end edge pairs in parallel contact with one another with a sliding fit.

4. The foil bearing according to claim 1, wherein the foil bearing is configured as a single surface bearing.

5. The foil bearing according to claim 1, wherein the foil bearing is configured as a multiple surface bearing.

6. A foil bearing for supporting a shaft, the bearing comprising:
    a top foil forming a bearing surface for contacting the shaft, wherein the top foil is not continuous and has two ends;
    a corrugated foil disposed radially outward of the top foil; and
    a sleeve-type bearing housing disposed radially outward of the corrugated foil, the bearing housing having an inner surface and an outer surface, the inner surface defining insertion grooves extending outwardly through the bearing housing, the insertion grooves receiving the ends of the top foil
    wherein a recess is provided at an end edge of the top foil, and a bolt extends through the recess and into the bearing housing such that the bolt secures the end edge of the top foil in an axial direction but allows movement of the end edge in the circumferential direction.

7. The foil bearing of claim 6, wherein the corrugated foil is not continuous and has two ends, and the insertion grooves receive the ends of the corrugated foil.

8. The foil bearing of claim 7, wherein each end of the top foil is held in parallel contact with a respective one of the ends of the corrugated foil within one of the insertion grooves.

9. The foil bearing of claim 6, wherein the ends of the top foil do not extend entirely into the insertion grooves.

10. The foil bearing of claim 6, wherein the ends of the top foil are slidably received within the insertion grooves.

* * * * *